United States Patent
Medina et al.

(10) Patent No.: US 11,981,420 B2
(45) Date of Patent: May 14, 2024

(54) ACTUATOR ASSEMBLY

(71) Applicant: Goodrich Actuation Systems SAS, Saint Ouen l-Aumone (FR)

(72) Inventors: Raphael Medina, Ecouen (FR); Karl Potier, Paris (FR); Corentin Boitard, Saint-Germain-en-Laye (FR)

(73) Assignee: GOODRICH ACTUATION SYSTEMS SAS, Saint Ouen l'Aumone (FR)

( * ) Notice: Subject to any disclaimer, the term of this patent is extended or adjusted under 35 U.S.C. 154(b) by 137 days.

(21) Appl. No.: 17/584,571

(22) Filed: Jan. 26, 2022

(65) Prior Publication Data
US 2022/0250737 A1    Aug. 11, 2022

(30) Foreign Application Priority Data

Feb. 5, 2021   (EP) ..................... 21305160

(51) Int. Cl.
| | |
|---|---|
| *B64C 13/34* | (2006.01) |
| *F16D 41/12* | (2006.01) |
| *F16H 37/04* | (2006.01) |
| *F16H 61/12* | (2010.01) |

(52) U.S. Cl.
CPC ............ *B64C 13/34* (2013.01); *F16H 37/04* (2013.01); *F16H 61/12* (2013.01); *F16D 41/12* (2013.01); *F16H 2061/1296* (2013.01)

(58) Field of Classification Search
CPC ..... B64C 13/34; B64C 3/50; B64C 2009/005; F16H 37/04; F16H 61/12; F16H 2061/1296; F16H 1/28; F16H 37/041; F16H 49/001; F16D 41/12
See application file for complete search history.

(56) References Cited

U.S. PATENT DOCUMENTS

| | | | | |
|---|---|---|---|---|
| 4,480,733 | A * | 11/1984 | Grimm | ................... B64C 13/34 |
| | | | | 192/223.3 |
| 4,926,631 | A * | 5/1990 | Sorenson | ................. F02C 7/277 |
| | | | | 60/788 |
| 6,739,550 | B2 | 5/2004 | Koizumi et al. | |
| 8,267,350 | B2 | 9/2012 | Elliott et al. | |

(Continued)

FOREIGN PATENT DOCUMENTS

| | | |
|---|---|---|
| GB | 2496455 A | 5/2013 |
| WO | 2015177301 A1 | 11/2015 |

OTHER PUBLICATIONS

European Search Report for Application No. 21305160.0, dated Jul. 16, 2021, 8 pages.

*Primary Examiner* — Joshua J Michener
*Assistant Examiner* — Cindi M Curry
(74) *Attorney, Agent, or Firm* — CANTOR COLBURN LLP

(57) ABSTRACT

An actuator system includes a motor and an actuator positioning member to be driven by the motor from a start position to an actuated position. The system also includes a harmonic drive assembly between the motor and the actuator positioning member arranged to transfer torque from the motor to the actuator positioning member at a gear ratio of greater than 1:1. The system further includes means for disconnecting the harmonic drive assembly in response to failure of the motor and/or torque transfer such as to allow the positioning member to return to the start position.

18 Claims, 2 Drawing Sheets

(56) References Cited

U.S. PATENT DOCUMENTS

| | | |
|---|---|---|
| 9,809,301 B2 | 11/2017 | Chavignier et al. |
| 10,759,515 B2 | 9/2020 | Van De Veire et al. |
| 2003/0080246 A1 | 5/2003 | Koizumi et al. |
| 2015/0184700 A1 | 7/2015 | Balsiger |
| 2015/0345606 A1 | 12/2015 | Balsiger |
| 2020/0263614 A1* | 8/2020 | Oyama .................. F02C 7/275 |
| 2021/0362859 A1* | 11/2021 | Willshee ................ F02C 7/275 |
| 2022/0333684 A1* | 10/2022 | Kang ..................... F16H 61/32 |

* cited by examiner

ACTUATOR ASSEMBLY

CROSS-REFERENCE TO RELATED APPLICATIONS

This application claims priority to European Patent Application No. 21305160.0 filed Feb. 5, 2021, the entire contents of which is incorporated herein by reference.

TECHNICAL FIELD

The present disclosure is concerned with an actuator system for driving a surface of an aircraft e.g. a flight control surface such as, but not limited to, a spoiler or an aileron.

BACKGROUND

Actuators are used in aircraft to control various moveable components and surfaces including, but not only, flight control surfaces such as spoilers, ailerons and wing flaps.

Conventionally, hydraulic actuators have been used in aircraft, whereby a hydraulic piston, connected to the surface, is moved in response to the flow of hydraulic pressure from a hydraulic supply. Whilst hydraulic actuators have been used in aircraft for many years and have many advantages, such systems are fairly heavy and bulky. As the actuators are supplied from the aircraft supply, often a large plumbing network is required to deliver the pressure to distributed actuators, and the level of reliability is low. Local hydraulically powered actuators cannot easily be provided at aircraft wing ends etc. especially on so-called 'thin wing' aircraft. Further, hydraulic systems are prone to leakage and require seals and connectors, which all add to the size and weight of the system.

There is now a trend in the aircraft industry towards More Electric Aircraft (MEA) and, more recently, to All Electric Aircraft (AEA) with the objective being to replace hydraulic systems and parts with electrical systems and parts. Electric systems can be smaller and lighter and are generally 'cleaner' than hydraulic systems. This leads to the use of electromechanical actuators which are either fully rotary or linear gear driven. Such mechanical architecture requires clearance to ensure proper operation of the gearbox.

One issue with aircraft surfaces such as ailerons and spoilers is that the aerodynamic forces acting on the surface can, due to clearances in the system, cause undamped free movement or 'flutter' which, in aircraft, during flight, can have catastrophic consequences. With hydraulic systems, this can occur if the hydraulic supply fails. Solutions are known to address this problem in hydraulic systems, to provide hydraulic damping to avoid or mitigate flutter, and any clearance is usually within acceptable tolerance ranges. The issue of flutter is of more concern with rotary electrical actuator systems. In aircraft, smaller motors are preferable, and so it is preferred to use low torque, high speed electric motors. This means, however, that a gear mechanism with a relatively high gear ratio is needed to provide a suitable, high torque output needed to drive the aircraft surfaces. The gear mechanism required for such systems, however, suffer from backlash to a greater extent than hydraulic systems, due to the clearance between the gear teeth, and there is a greater problem with flutter.

There is, therefore, a need for an actuator system with reduced clearance, so causing less backlash and less flutter, that uses electrical drive means with a sufficiently high gear ratio to allow the use of a small electric motor.

When controlling aircraft flight control surfaces, it is also necessary that the actuator is reversible—i.e. that the actuator can be back-driven. This feature is necessary in the event that the drive motor fails. It is necessary, for safety reasons, that in such circumstances, the actuator can be automatically reversed to return the control surface to a safe position.

SUMMARY

According to the present disclosure, there is provided an actuator system comprising a motor e.g. an electric motor and an actuator positioning member to be driven by the motor from a start position to an actuated position, and a harmonic drive assembly between the motor and the actuator positioning member arranged to transfer torque from the motor to the actuator positioning member at a gear ratio of greater than 1:1, the system further comprising means for disconnecting the harmonic drive assembly in response to failure of the motor and/or torque transfer such as to allow the positioning member to return to the start position.

The means for disconnecting preferably comprises an epicyclic gear assembly comprising planter gears on an axle and an outer ring, and a ratchet mechanism of teeth and pawls. The ratchet mechanism may be configured to unload the planetary gear system from the harmonic drive in response to the failure to allow the planetary gear system to rotate independent of the harmonic drive. A plurality of teeth may extend from the outer ring of the planetary gear system and one or more pawls may be biased to engage with the teeth to load the outer ring and arranged to disengage from the teeth in response to the failure.

A first pawl may be biased to engage with a first side of the teeth e.g. via a solenoid and a second pawl may be arranged to engage with a second side of the teeth e.g. via a spring. In response to the failure, the first pawl may disengaged from the teeth while the second pawl remains in engagement with the teeth such that the planetary gear system may only rotate in one direction. Alternatively, both the first and second pawl may be biased by means of a solenoid and, in response to failure, both pawls are disengaged from the teeth such that the planetary gear system can rotate in both directions.

The system may be incorporated in an aircraft control surface assembly to move a flight control surface such as a spoiler or an aileron.

According to another aspect, there is provided a method of driving an actuator positioning element from a start position to an actuated position comprising driving a harmonic drive assembly with a motor, driving the positioning element by transferring torque at a gear ratio of greater than 1:1 from the motor, via the harmonic drive, and, in response to failure to transfer a torque from the motor to the positioning element, disengaging the positioning element from the harmonic drive to allow the positioning element to return to the start position.

BRIEF DESCRIPTION

Examples of the invention will now be described, by way of example only, with reference to the drawings.

DETAILED DESCRIPTION

Figure 1:
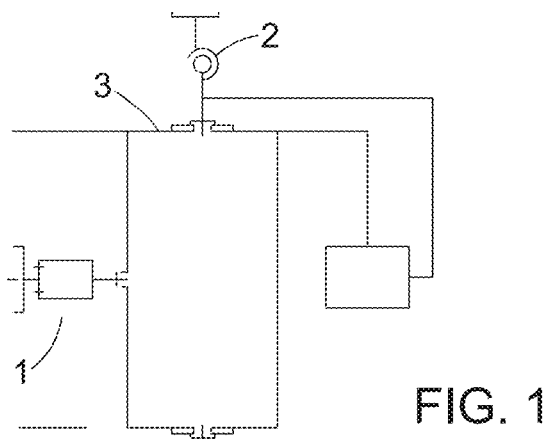
FIG. 1 is a schematic view of a conventional rotary electrical actuator system, by way of background.

Referring briefly to FIG. 1, this shows a conventional actuator system with a rotary electric motor 1. As mentioned above, to minimise size and weight, the motor 1 is preferably a small, low torque, high speed motor. In order to drive the actuator lever 2 at the required high torque, a gear system 3 (not described here in any detail) is required between the motor 1 and the lever 3. In the example shown, a four-stage gear system 3 is provided. In the event of failure, the gears can be disengaged, by a clutch or ratchet mechanism, to allow backdrive so that the panel can return to a safe neutral position. A problem with such systems is that the clearance between the gear teeth, i.e. backlash, can lead to surface flutter.

There is, therefore, a need for a gear system that is able to provide high gearing ratios without such backlash, to reduce flutter within a small envelope. A mechanism that is known to provide a high gear ratio is a harmonic drive. A harmonic drive comprises an elliptical disk with an outer bearing around which is mounted a flex spline. The outer teeth of the elliptical flex spline engage with inner teeth of an outer circular spline at points as the elliptical disk rotates causing rotation of the elliptical flex spline but at a slower rate.

A harmonic drive provides high gear ratios and is compact and lightweight but, unlikely the rotary systems currently in use for aircraft flight control actuation, has no, or minimum backlash.

Whilst harmonic drives have these advantages, they have not found application in actuator systems for aircraft control surfaces because they cannot or cannot easily be back-driven i.e. they are not reversible. As mentioned above, it is important, in aircraft, that the actuator system is reversible in the event of motor failure, to allow the control surface to return to a safe, neutral position.

The inventors have provided a system that enables the use of a harmonic drive assembly, to reduce gear clearance, in an actuator system for an aircraft control surface, providing all the known advantages of a harmonic drive assembly, but with further modification to allow the actuator system to be reversible in the event of failure.

The system of the disclosure will be described, by way of example only, with reference to FIGS. 2 and 3.

Figure 2A:
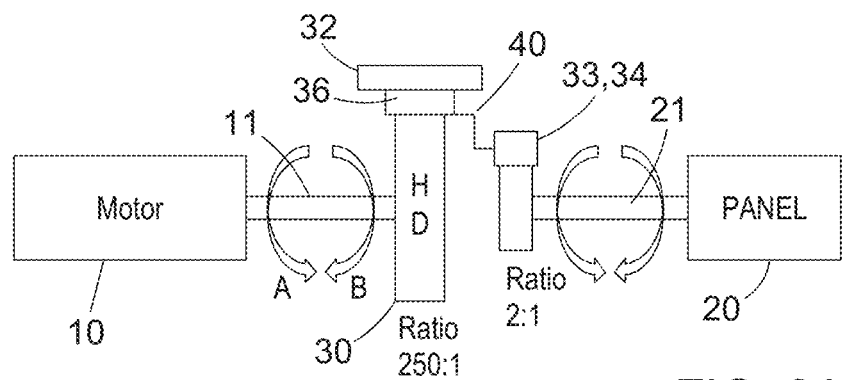
FIG. 2A is a schematic view of a system according to the disclosure in a normal mode of operation.

FIG. 2A shows the system in normal operation where the electric motor 10 is causing movement of the aircraft surface 20. As the motor is a small, low torque, high speed motor, gearing is required to provide the high torque, low speed output required by the aircraft surface 20. The gearing required is provided by a harmonic drive assembly 30. In short, the motor 10 rotates motor shaft 11 in the desired direction (shown by arrows A, B). The torque is amplified by the harmonic drive 30, which, in the example shown, provides a gear ratio of 250:1. This is, of course, only one example, and other gear ratios can be selected depending on the application of the system. The outer ring of the harmonic drive is connected to an epicyclic gear assembly (32, 33, 34, 36, 40), the outer ring (32) of which is locked by a ratchet system (explained further with reference to FIG. 2B) to permit torque transmission to the moveable surface. The harmonic drive drives the actuator shaft 21 in a corresponding direction but at lower speed than the rotation of the motor shaft 11, to move the control surface 20 as required.

If there is a failure in the drive system, it is necessary, for safety reasons, to return the control surface 20 to a safe neutral position rather than the elevated position to which it has been moved by the actuator. The failure may be due to motor failure or some other failure in the actuator system.

As mentioned above, a standard harmonic drive does not provide the capability of the backdrive function. If the actuator of the aircraft control system were driven with a standard harmonic drive and the motor failed, the engagement between the teeth of the flex spline and the outer spline would prevent any backdrive and the control surface would be stuck in its actuated position. The aerodynamic forces acting to return the surface to the neutral position would not be able to overcome the engagement of the teeth.

According to this disclosure, in order to provide a backdrive capability to the harmonic drive assembly, an epicyclic gear assembly whose outer ring is connected to a ratchet system is provided as will be described further below with reference to FIGS. 2B and 3B.

Figure 2B:
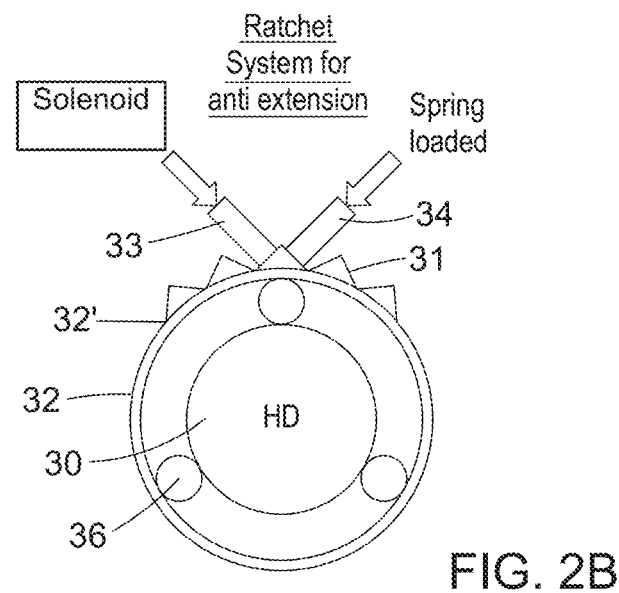
FIG. 2B shows the system of FIG. 2A in more detail in normal operation where the outer ring is locked.

Referring first to FIG. 2B, the harmonic drive 30 is shown in simplified form. As described above, the harmonic drive 30 will include the elliptical disk or wave generator, around which are closely fitted ball bearings. The flex spline will be closely fitted over the bearings and is caused to rotate in an elliptical manner as the wave generator is rotated by the motor shaft. The flex spline has teeth that engage with inner teeth of a circular outer ring of the harmonic drive. These components are not shown here, as such structure is well-known. Due to the elliptical shape of the inner ring, it only engages with the outer ring at two points during rotation. The gear ratio is determined by the respective number of inner and outer teeth. The internal workings of the harmonic drive 30 are known and are not described herein in any detail.

According to this disclosure, in order to add a back-drive capability to the system, an epicyclic gear assembly 36, 32 is added to the harmonic drive 30, as will be described further below. The epicyclic gear system is represented in FIG. 2B as a system of planetary gears 36 within an outer ring 32. The outer ring 32 is provided with a ratchet mechanism comprising outer teeth 31 and pawls 33,34 described further below. In normal operation (see e.g. FIGS. 2A and 2B) the outer ring 32 is locked or loaded such that the planetary gear system 36 rotates with the harmonic drive when this is driven by the motor 10, via the motor shaft 11, and in turn moves the movable surface e.g. via an actuator shaft 21. In normal operation, as shown in FIG. 2A, the outer teeth 31 of ratchet mechanism, on the outer gear wheel 32 are engaged by the ratchet mechanism pawls 33,34 so that the epicycle gear system is in engagement with the harmonic drive and rotates therewith.

Figure 3A:
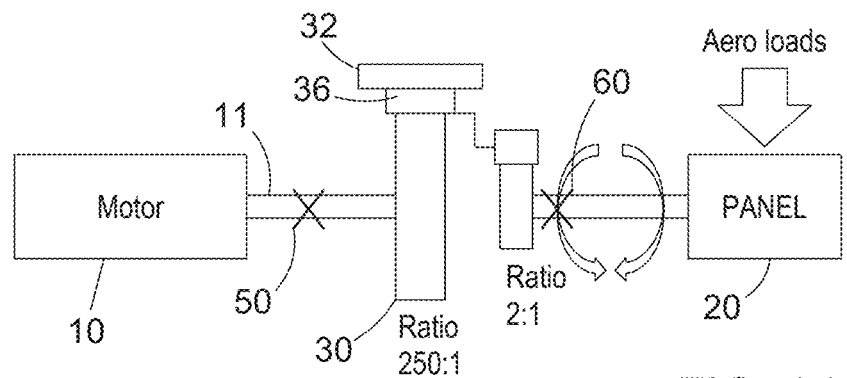
FIG. 3A is a schematic view of the system of FIG. 2 in a reverse mode.
Figure 3B:
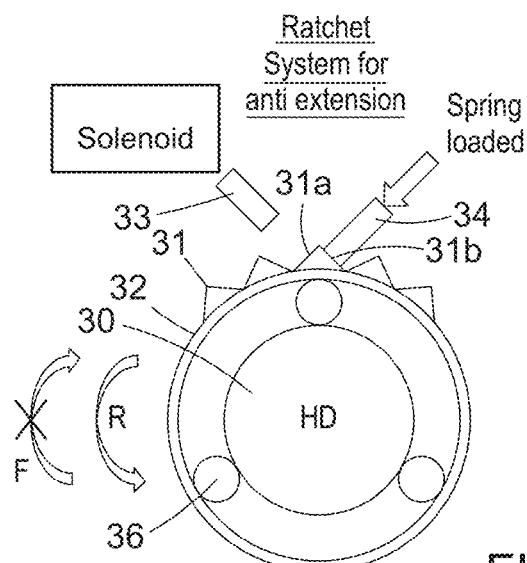
FIG. 3B shows the harmonic drive in more detail in reverse operation

If, however, a failure occurs in the drive system e.g. a motor or shaft failure indicated by the 'X' 50,60 in FIG. 3A, the motor 10 is no longer able to drive the actuator to move the surface back to a neutral position and the harmonic drive is not capable of being (or of easily being) back driven. This means that the surface could be stuck in the elevated position which can have catastrophic consequences.

To address this problem, the system of the present disclosure modifies the drive system to add a backdrive function and, where required, an anti-extension function. This will be described in more detail with particular reference to FIGS. 2B and 3B.

The modification is provided in the form of the epicyclic gear system 36, 32 and the ratchet system 31, 33, 34 comprising means for unloading the outer ring 32 of the epicyclic gear system to disengage the planetary gears 36 from the harmonic drive so that the epicyclic gear system can rotate freely with respect to the harmonic drive 30. The ratchet system comprises teeth 31 provided on the outer surface 32' of the outer wheel 32 and one or more pawls 33, 34 configured to engage with the teeth, in normal operation, so as to lock the outer ring 32 with respect to the harmonic drive 30 so as to rotate with rotation of the harmonic drive. In the example shown, a first pawl 33 is biased into engagement with one side 31a of the teeth 31 by means of a solenoid (not shown) and a second pawl 34 is biased into engagement with the opposite side 31b of the teeth by a spring force. Other means for biasing the pawl(s) into engagement with the teeth can also be envisaged. The outer ring is therefore immobilised.

In normal operation (FIGS. 2A and 2B) the pawls engage the teeth on the outer ring 32 to load the outer ring and, thus, the epicyclic gears 36 into engagement with the harmonic drive 30 so that rotation of the motor shaft 11, by the motor 10, causes rotation of the harmonic drive wave generator (not shown), and thus the ball bearings (not shown) and the harmonic drive outer ring (not shown). Because the outer ring 32 of the epicyclic system is locked or loaded, the harmonic drive 30 will drive the planetary gears 36, transmitting torque via the gear axle 40. This, in turn, causes rotation of the actuator shaft 21 with which the epicyclic system is connected, to drive the surface 20.

In the event of a failure (FIGS. 3A, 3B), the ratchet system is driven to release one or more pawls from engagement with the outer ring teeth 31 to disengage the outer ring so that the epicyclic gear system can rotate freely with respect to the harmonic drive. Aerodynamic forces acting on the aircraft surface to drive the surface to the neutral position are, therefore, not opposed by the harmonic drive (which has poor backdrive capabilities) and the epicyclic gear system is able to backdrive, thus allowing the surface to return to a safe position.

In the example shown, the ratchet mechanism comprises two pawls 33, 34 each acting against a respective side of the outer teeth 31. In some applications, e.g. for a spoiler, disengagement of the outer ring 32 should be such that it is only able to freely rotate in one direction. Therefore, one pawl 33 is driven by e.g. a solenoid or other actuable drive that is activated when it is required to disengage the outer ring 32, e.g. when electrical power is lost or the flight control computer is not communicating with the actuator. The other pawl 34, however, remains biased against the teeth to prevent movement in that direction. This pawl 34 may be biased against the teeth by e.g. a spring force which is sufficient to allow the outer ring to rotate in the direction of arrow R but not in direction F. This provides an anti-extension function so that in the event of drive system failure, the spoiler can return, under aerodynamic forces, to the flat position but not to the elevated position. In other applications, e.g. when used for actuating an aileron, the ratchet mechanism 40 can be configured to allow the outer ring to rotate in both F and R directions when disengaged.

The actuator system of this disclosure has the advantages of an electric actuator with high gear ratio and the advantages of a harmonic drive including no, or reduced backlash, whilst also providing a backdrive capability in the event of system failure. The modified drive assembly has a reduced envelope for the given gear ratio and is generally more compact so can be used e.g. in thin wing aircraft.

Although described in relation to actuation of an aircraft control surface, the actuator system of this disclosure may find application in other systems where a surface or component is moved using an actuator.

The invention claimed is:

1. An actuator system comprising:
   a motor;
   an actuator shaft configured to be driven by the motor from a start position to an actuated position;
   a harmonic drive assembly between the motor and the actuator shaft arranged to transfer torque from the motor to the actuator shaft at a gear ratio of greater than 1:1; and
   means for disconnecting the harmonic drive assembly in response to failure of the motor or a torque transfer from the motor to the actuator shaft to allow the actuator shaft to return to the start position;
   wherein the means for disconnecting comprises an epicyclic planetary gear assembly connected to an outer ring of the harmonic drive assembly, and a ratchet mechanism to which an outer ring of the epicyclic gear assembly is connected.

2. The actuator system of claim 1, wherein the epicyclic planetary gear assembly is configured to rotate with the outer ring of the harmonic drive when the outer ring of the epicyclic planetary gear assembly is locked in engagement therewith by the ratchet mechanism;
   wherein the ratchet mechanism is configured to unload the epicyclic planetary gear assembly from the harmonic drive in response to the failure to allow the planetary gear system to rotate independent of the harmonic drive.

3. The actuator system of claim 2, wherein the means for disconnecting comprises a plurality of teeth extending from the outer ring of the epicyclic planetary gear assembly and one or more pawls biased to engage with the teeth to load the outer ring and arranged to disengage from the teeth in response to the failure.

4. The actuator system of claim 3, wherein the one or more pawls comprises a first pawl biased to engage with a first side of the teeth and a second pawl arranged to engage with a second side of the teeth.

5. The actuator system of claim 4, wherein the first pawl is biased by means of a solenoid and the second pawls is biased by a spring force, and wherein, in response to the failure, the first pawl is disengaged from the teeth while the second pawl remains in engagement with the teeth such that the epicyclic planetary gear assembly may only rotate in one direction.

6. The actuator system of claim 4, wherein both the first and second pawl are biased by means of a solenoid and, in response to failure, both pawls are disengaged from the teeth such that the epicyclic planetary gear assembly can rotate in both directions.

7. The actuator system of claim 1, further comprising:
   a motor shaft connecting the motor to the harmonic drive and the actuator shaft being an actuator shaft connecting the harmonic drive to a surface or component to be moved.

8. The actuator system of claim 1, configured to be connected to a surface or component of an aircraft to be moved by the actuator.

9. The actuator system of claim 1, wherein the motor is an electric motor.

10. An aircraft control surface assembly comprising:
    a flight control surface; and
    an actuator system as claimed in claim 1 configured to move the flight control surface.

11. The assembly of claim 10, wherein the flight control surface is a spoiler.

12. The assembly of claim 10, wherein the flight control surface is an aileron.

13. A method of driving an actuator shaft from a start position to an actuated position comprising:
- driving a harmonic drive assembly with a motor;
- driving the actuator shaft by transferring torque at a gear ratio of greater than 1:1 from the motor, via the harmonic drive; and
- in response to failure to transfer a torque from the motor to the actuator shaft, disengaging the actuator shaft, by a means for disconnecting, from the harmonic drive to allow the actuator shaft to return to the start position;
- wherein the means for disconnecting comprises an epicyclic planetary gear assembly connected to an outer ring of the harmonic drive assembly, and a ratchet mechanism to which an outer ring of the epicyclic gear assembly is connected.

14. An actuator system comprising:
- a motor;
- an actuator shaft configured to be driven by the motor from a start position to an actuated position;
- a harmonic drive assembly between the motor and the actuator shaft arranged to transfer torque from the motor to the actuator shaft at a gear ratio of greater than 1:1; and
- means for disconnecting the harmonic drive assembly in response to failure of the motor or a torque transfer from the motor to the actuator shaft to allow the actuator shaft to return to the start position;
- wherein the means for disconnecting comprises:
  - a planetary gear system configured to rotate with the harmonic drive when locked in engagement therewith by a ratchet mechanism;
  - wherein the ratchet mechanism configured to unload the planetary gear system from the harmonic drive in response to the failure to allow the planetary gear system to rotate independent of the harmonic drive.

15. The actuator system of claim 14, wherein the means for disconnecting comprises a plurality of teeth extending from an outer ring of the planetary gear system and one or more pawls biased to engage with the teeth to load the outer ring and arranged to disengage from the teeth in response to the failure.

16. The actuator system of claim 13, wherein the one or more pawls comprises a first pawl biased to engage with a first side of the teeth and a second pawl arranged to engage with a second side of the teeth.

17. The actuator system of claim 16, wherein the first pawl is biased by means of a solenoid and the second pawls is biased by a spring force, and wherein, in response to the failure, the first pawl is disengaged from the teeth while the second pawl remains in engagement with the teeth such that the planetary gear system may only rotate in one direction.

18. The actuator system of claim 16, wherein both the first and second pawl are biased by means of a solenoid and, in response to failure, both pawls are disengaged from the teeth such that the planetary gear system can rotate in both directions.

* * * * *